(12) United States Patent
Hsu et al.

(10) Patent No.: US 12,072,534 B2
(45) Date of Patent: Aug. 27, 2024

(54) FIBER TO CHIP COUPLER AND METHOD OF USING

(71) Applicant: TAIWAN SEMICONDUCTOR MANUFACTURING COMPANY, LTD., Hsinchu (TW)

(72) Inventors: Sui-Ying Hsu, Hsinchu (TW); Yuehying Lee, Hsinchu (TW); Chien-Ying Wu, Hsinchu (TW); Chen-Hao Huang, Hsinchu (TW); Chien-Chang Lee, Hsinchu (TW); Chia-Ping Lai, Hsinchu (TW)

(73) Assignee: TAIWAN SEMICONDUCTOR MANUFACTURING COMPANY, LTD., Hsninchu (TW)

(*) Notice: Subject to any disclaimer, the term of this patent is extended or adjusted under 35 U.S.C. 154(b) by 29 days.

(21) Appl. No.: 17/459,917

(22) Filed: Aug. 27, 2021

(65) Prior Publication Data

US 2023/0064550 A1   Mar. 2, 2023

(51) Int. Cl.
*G02B 6/34* (2006.01)
*G02B 6/30* (2006.01)

(52) U.S. Cl.
CPC .................................. *G02B 6/34* (2013.01);
*G02B 6/30* (2013.01)

(58) Field of Classification Search
CPC ........... G02B 6/34; G02B 6/30; G02B 6/4214
See application file for complete search history.

(56) References Cited

U.S. PATENT DOCUMENTS

| | | | | |
|---|---|---|---|---|
| 11,320,586 | B2* | 5/2022 | Tortschanoff | G02B 6/02085 |
| 2009/0290837 | A1* | 11/2009 | Chen | G02B 6/305 |
| | | | | 385/37 |
| 2010/0322555 | A1* | 12/2010 | Vermeulen | G02B 6/34 |
| | | | | 385/28 |
| 2013/0308906 | A1* | 11/2013 | Zheng | G02B 6/4214 |
| | | | | 29/592 |
| 2018/0129060 | A1* | 5/2018 | Lee | G02B 6/0036 |
| 2022/0276452 | A1* | 9/2022 | Freedman | G02B 6/4206 |

* cited by examiner

*Primary Examiner* — Michael P Mooney
(74) *Attorney, Agent, or Firm* — Hauptman Ham, LLP (57) ABSTRACT

A coupling system includes an optical fiber configured to carry an optical signal. The coupling system further includes a chip in optical communication with the optical fiber. An angle between the optical fiber and a top surface of the chip ranges from about 92-degrees to about 88-degrees. The chip includes a grating configured to receive the optical signal; and a waveguide, wherein the grating is configured to receive the optical signal and redirect the optical signal along the waveguide. ms.

20 Claims, 11 Drawing Sheets

FIBER TO CHIP COUPLER AND METHOD OF USING

BACKGROUND

Optical gratings are usable for directing optical signals between a chip and an optical fiber. Optical gratings are usable for directing optical signals from the chip to the optical fiber as well as directing optical signals from the optical fiber to the chip. The ability of the optical grating to effectively couple the chip to the optical fiber is based on an angle between the optical fiber and the optical grating. In a standard optical grating, the optical fiber is oriented at an angle of close to 10-degrees relative to a normal from the top surface of the optical grating.

A cavity is formed in the layers of the chip between the optical fiber and the optical grating in order to reduce signal loss for the optical signal passing through the layers of the chip. The signal loss is due to absorption, reflecting, refracting, and the like. As the angle between the optical grating and the optical fiber increases, a dimension of the cavity increases. Increasing the dimension of the cavity in turn leads to increased size of the chip.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As the size of semiconductor chips continues to decrease, density of features, such as interconnect structures, within the chip increases. Forming openings in interconnect structures reduces routing possibilities and limits the ability to reduce the size of the chips. As the size of the opening increases, the impacts of the opening on the interconnect structure are exacerbated.

Optical communication between chips is also increasing in order to permit the rapid transfer of information from one device to another device. Optical gratings are used to couple optical signals from inside of the chip to an optical fiber extending between different devices. In order to reduce signal loss, openings or cavities are formed in the interconnect structure to reduce the amount of material that the optical signal propagates through between the optical fiber and the optical grating.

A standard grating, which has uniform pitch, depth and width of features, is able to couple the optical signal between the chip and the optical fiber only when the optical fiber is angled at a significant angle with respect to a normal from a top surface of the standard grating. The angle of the optical fiber relative to the optical grating and the natural divergence of light exiting the optical fiber dictates that a dimension of the opening in the interconnect structure is increased. This increased dimension reduces routing possibilities within the interconnect structure and limits the ability to reduce the size of the chip.

An optical grating that has variations in at least one of pitch, depth and width of grating feature in a direction in which coupling is to occur helps to effectively couple the optical fiber to the chip even when the optical fiber is positioned close to a normal from the top surface of the optical grating will reduce the size of the opening in the interconnect structure. Including such an optical grating will increase the routing possibilities and the chip is able to have reduced size in comparison with other chips that do not include such an optical grating.

Figure 1:
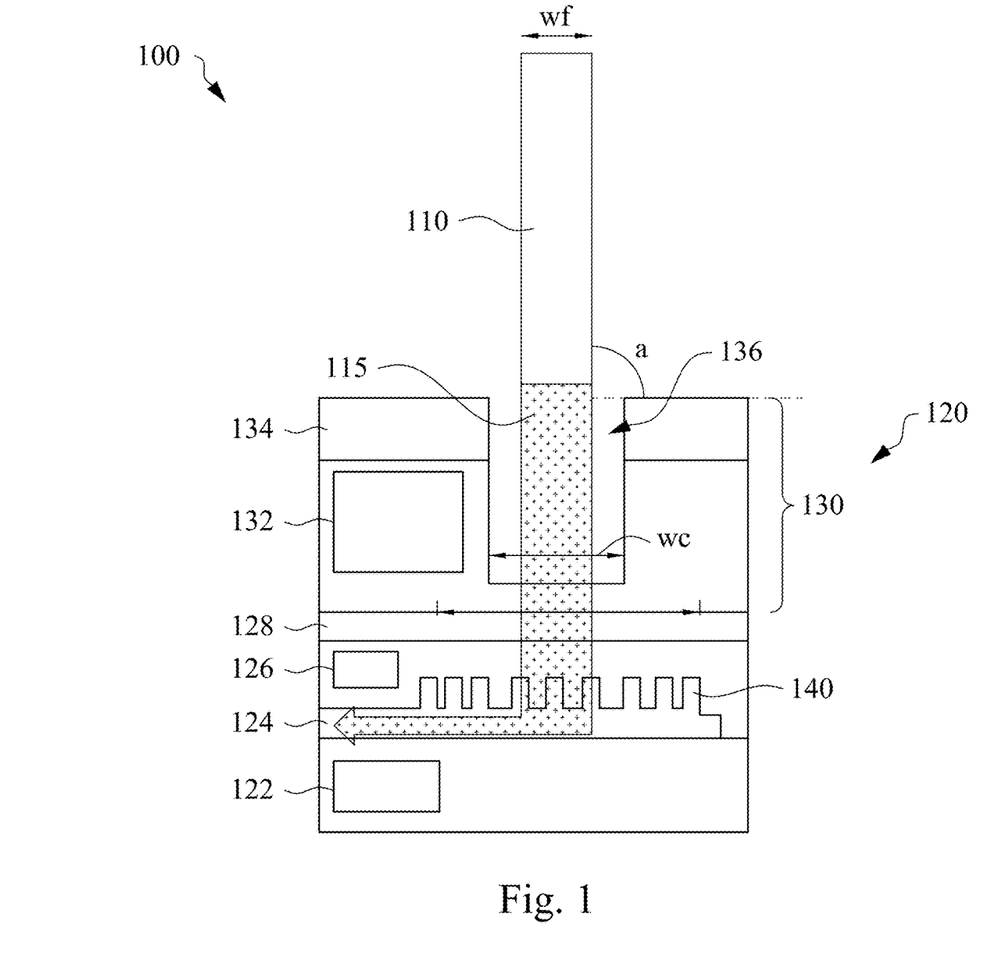
FIG. 1 is a view of a fiber to chip coupling system in accordance with some embodiments.

FIG. 1 is a cross sectional view of a fiber to chip coupling system 100 in accordance with some embodiments. System 100 includes an optical fiber 110 configured to emit an optical signal 115. System 100 further includes a chip 120. Chip 120 includes a substrate 122. A waveguide layer 124 is over the substrate 122. An inter-layer dielectric (ILD) 126 is over the waveguide layer 124. An etch stop layer 128 is over the ILD 126. An interconnect structure 130 is over the etch stop layer 128. The interconnect structure 130 includes an inter-metal dielectric (IMD) layer 132 and a conductive layer 134. FIG. 1 includes a single IMD layer 132 and conductive layer 134. However, one of ordinary skill in the art would recognize that the interconnect structure 130 includes multiple IMD layers and conductive layers in order to electrically connect different components of the chip 120. An opening 136 extends through a portion of the interconnect structure 130. A grating 140 extends from the waveguide layer 124 and is configured to receive the optical signal 115 passing through the opening 136, any remaining portion of the interconnect structure 130, the etch stop layer 128 and the ILD 126. The grating 140 is configured to direct the optical signal 115 into the waveguide layer 124 to components within the chip 120. One of ordinary skill in the art would recognize that additional layers, such as cladding and reflective layers, would be included in the system 100. Some of these layers are discussed in more detail below.

The optical fiber 110 is a single mode optical fiber having a width wf ranging from about 8 microns (μm) to about 12 μm. In some embodiments, the optical fiber 110 is a multimode optical fiber having a width wf ranging from about 45 μm to about 70 μm. The width wf is based on a size of a core of the optical fiber 110 including any additional cladding or cover layers. If the width wf is too large, then the size of the optical fiber 110 is unnecessarily increased. If the width wf is too small, then there is a risk of loss of optical signal from the core or interference of the optical signal from external light sources. The optical fiber 110 is configured to convey the optical signal 115 from an external device to chip 120. The optical fiber 110 is positioned normal, i.e., at an angle a of 90-degrees, with respect to a top surface of the chip 120 (or the top surface of the grating 140). In some embodiments, the angle a deviates from the normal position by up to 2-degrees, i.e., from about 92-degrees to about 88-degrees. As the deviation of the angle a from normal increases a width we of the cavity 136 increases reducing routing possibilities and increasing a size of the chip 120.

The optical signal 115 has a wavelength. In some embodiments where the optical fiber 110 is a single mode fiber, the wavelength of the optical signal 115 ranges from about 1260 nanometers (nm) to about 1360 nm. In some embodiments where the optical fiber 110 is a multimode optical fiber, the wavelength of the optical signal 115 ranges from about 770 nm to about 910 nm. The wavelength of the optical signal 115 is based on a light source used to generate the optical signal. In some embodiments where the optical fiber 110 is a single mode optical fiber, the light source is a laser or a laser diode. In some embodiments where the optical fiber 110 is a multimode optical fiber, the light source of the optical fiber is a light emitting diode (LED). The optical signal 115 will diverge upon exiting the optical fiber 110.

The chip 120 includes at least one optoelectronic component, such as a laser driver, digital control circuit, photodetectors, waveguides, small form-factor pluggable (SFP) transceiver, High-speed phase modulator (HSPM), calibration circuit, distributed Mach-Zehnder Interferometer (MZI), grating couplers, light sources, (i.e., laser), or the like. The optoelectronic component is configured to receive the optical signal 115 from the waveguide layer 124 and convert the optical signal 115 into an electrical signal. While the description of FIG. 1 is written as the chip 120 receiving the optical signal 115 from the optical fiber 110, one of ordinary skill in the art would understand that the system 100 is also usable to transfer an optical signal from the chip 120 to the optical fiber 110. That is, the optoelectronic component generates the optical signal, which is then transferred to the optical fiber 110 through the waveguide layer 124 and the grating 140, in some embodiments.

In some embodiments, substrate 122 includes an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, substrate 122 is a strained SiGe substrate. In some embodiments, the semiconductor substrate has a semiconductor on insulator structure, such as a silicon on insulator (SOI) structure. In some embodiments, the semiconductor substrate includes a doped epi layer or a buried layer. In some embodiments, the compound semiconductor substrate has a multilayer structure, or the substrate includes a multilayer compound semiconductor structure.

The waveguide layer 124 is configured to direct the optical signal 115 from the grating 140 to an optoelectronic component of the chip 120. The waveguide layer 124 includes an optical transparent material. In some embodiments, the waveguide layer 124 includes silicon. In some embodiments, the waveguide layer 124 includes plastic. In some embodiments, the waveguide layer 124 includes a same material as the grating 140. In some embodiments, the waveguide layer 124 includes a different material from the grating 140. In some embodiments, the waveguide layer 124 is integral with the grating 140. In some embodiments, the waveguide layer 124 is a slab waveguide, a planar waveguide or a light pipe. In order for the grating 140 to effectively couple the optical signal 115 into the waveguide layer 124, the grating 140 redirects the incident optical signal 115 into an angle of acceptance of the waveguide layer 124. The angle of acceptance of the waveguide layer 124 is based on the wavelength of the optical signal, the frequency of the optical signal and dimensions of the waveguide layer 124. The ILD 126 includes a dielectric material. Contacts are formed through the ILD 126 to electrically connect the optoelectronic component to the interconnect structure 130 and to other components within the chip or to external devices. The ILD 126 is deposited on the substrate 122 using chemical vapor deposition, physical vapor deposition, or another suitable deposition process. In some embodiments, the ILD 126 has a thickness ranging from about 500 nm to about 3000 nm. If the thickness is too great, an aspect ratio for forming the contacts through the ILD 126 makes reliable manufacturing difficult and absorption of the optical signal 115 reduces the strength of the optical signal to an unacceptable level, in some instances. If the thickness is too small, the ILD 126 fails to provide sufficient electrical insulating between conductors, such as conductive layer 134, and other components in the chip 120. In some embodiments, the ILD 126 includes dielectric materials, such as Si, $Si_3N_4$, $SiO_2$ (e.g., quartz, and glass), Al2O3, and H2O, according to various embodiments of the present disclosure. The etch stop layer 128 is over the ILD 126 and has a different etch chemistry from the ILD 126 and the IMD layer 132. In some embodiments, the etch stop layer 128 is deposited using chemical vapor deposition or another suitable deposition process. In some embodiments, the etch stop layer 128 includes SiC $Si_3N_4$, or another suitable material. In some other embodiments, the etch stop layer 128 has a thickness in a range of about 250 nm to about 350 nm. If the thickness of the etch stop layer 128 is too great, then material is wasted and absorption of the optical signal 115 reduces the strength of the optical signal to an unacceptable level, in some instances. If the thickness of the etch stop layer 128 is too small, then a risk of etching through the etch stop layer 128 during the formation of the cavity 136 or formation of electrical connections between the ILD 126 and the conductive layer 134 increases, in some instances.

The interconnect structure 130 is configured to electrically connect the optoelectronic component to other components within the chip 120 or to external devices, for example, through chip bonding. FIG. 1 includes a single IMD layer 132 and a single conductive layer 134 for the sake of brevity. However, one of ordinary skill in the art would recognize that the interconnect structure 130 includes numerous IMD layers and conductive layers.

The IMD layer 132 includes a dielectric material. The IMD layer 132 provides electrical insulation between the conductive layer 134 and other conductive elements within the chip 120, such as the contacts in the ILD 126. The IMD layer 132 is deposited on the etch stop layer 128 using chemical vapor deposition, physical vapor deposition, or another suitable deposition process. In some embodiments, the IMD layer 132 has a thickness ranging from about 1,000 angstroms to about 30,000 angstroms. If the thickness is too great, an aspect ratio for forming the electrical connections through the IMD layer 132 makes reliable manufacturing difficult, in some instances. If the thickness is too small, the IMD layer 132 fails to provide sufficient electrical insulating between conductors, such as conductive layer 134, and other components in the chip 120. In some embodiments, the IMD layer 132 includes dielectric materials, such as Si, $Si_3N_4$, $SiO_2$ (e.g., quartz, and glass), Al2O3, and H2O, according to various embodiments of the present disclosure. In some embodiments, the IMD layer 132 includes a low-k dielectric material. In some embodiments, the IMD layer 132 includes a same material as the ILD 126. In some embodiments, the IMD layer 132 includes a different material from the ILD 126.

The conductive layer 134 is configured to convey electrical signals to various components in the chip 120, for example the optoelectronic component. In some embodiments the conductive layer 134 includes a seed layer. In some embodiments, the conductive layer 134 includes copper, aluminum, tungsten, alloys thereof or another suitable material.

The cavity 136 reduces an amount of material that the optical signal 115 passes through before being directed into the waveguide layer 124 by the grating 140. The cavity 136 extends through the conductive layer 134 and partially through the IMD layer 132. In some embodiments, the cavity 136 extends through an entirety of the interconnect structure 130 to expose the etch stop layer 128. The sidewalls of the cavity 136 are substantially vertical. In some embodiments, the sidewalls of the cavity 136 are tapered. In some embodiments, a width wc of the cavity ranges from about 10% to about 20% more than the width wf of the optical fiber 110. In some embodiments, the width wc ranges from about 11 μm to about 12 μm. This width wc helps to account for misalignment between the optical fiber 110 and the cavity 136. The width wc also helps to permit the entire optical signal 115 to pass through the cavity 136 even though the optical signal 115 will diverge upon exiting from the optical fiber. If the width wc is too small, then misalignment or divergence of the optical signal 115 will increase the risk of loss of a portion of the optical signal 115, in some instances. If the width wc is too great, then routing possibilities in the interconnect structure 130 are reduced or an overall size of the chip 120 is increased, in some instances.

The grating 140 is configured to couple the optical signal 115 from the optical fiber 110 into the waveguide layer 124. The grating 140 directs the optical signal 115 at a 90-degree angle from the angle of incident of the optical signal 115 on the grating 140. The grating 140 includes a variable grating section in portion closer to the optoelectronic component, i.e., the direction of propagation. In FIG. 1, the variable grating section is on a left side of the grating 140 as indicated by the arrow in the optical signal 115. The variable grating section includes grating features having different geometric dimensions. In some embodiments, the variable grating section includes grating features having a variation in width, depth, pitch or combinations thereof. The variable grating section helps the grating 140 to redirect the optical signal approximately 90-degrees, which permits the perpendicular orientation of the optical fiber 110, thereby reducing the width wc of the cavity 136. As a result, the chip 120 is able to be reduced in size and routing possibilities in the interconnect structure 130 are maximized.

In some embodiments, the grating 140 includes a uniform grating section in a portion farther from the optoelectronic component, i.e., opposite the direction of propagation. The uniform grating section includes grating features having consistent geometric dimensions. In some embodiments, a length of the uniform grating section, parallel to the top surface of the grating, is less than about 50% of a length of the variable grating section. If the length of the uniform grating section is too great, the grating 140 will not reliably couple the optical signal into the waveguide layer 124, in some instances. Including the variable grating section closer to the optoelectronic component than the uniform grating section helps the grating 140 redirect the optical signal 115 closer to the optoelectronic component at a more severe angle. For example, in some embodiments where the grating 140 is over the waveguide layer 124, grating features of the grating farther from the optoelectronic component are able to redirect light at a less severe angle, e.g., 85-degrees to 88-degrees, and still couple the optical signal 115 into the waveguide layer 124.

The grating 140 includes an optical transparent material. In some embodiments, the grating 140 includes silicon. In some embodiments, the grating 140 includes plastic.

Figure 2:
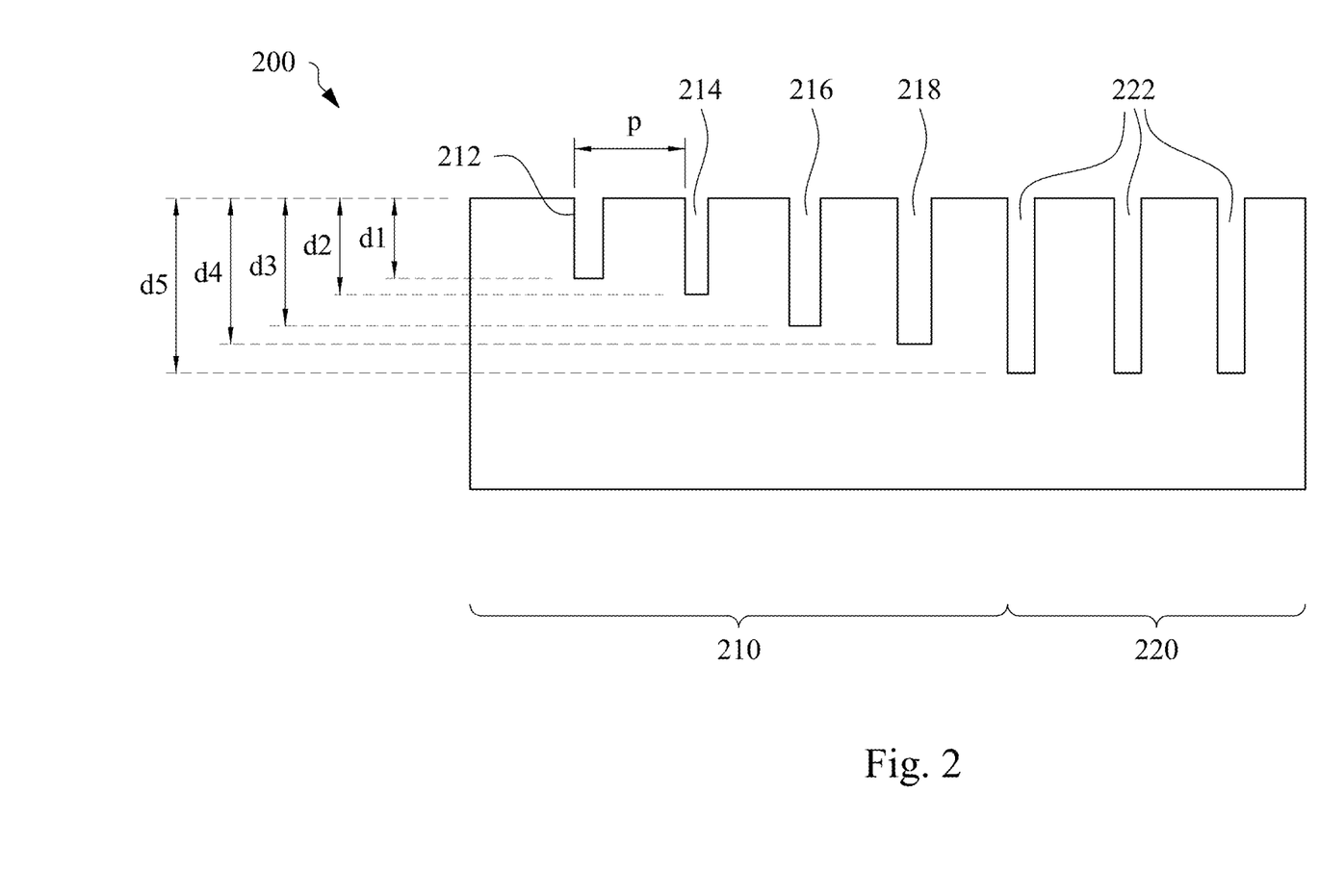
FIG. 2 is a cross sectional view of a grating in accordance with some embodiments.

FIG. 2 is a cross sectional view of a grating 200 in accordance with some embodiments. Grating 200 is usable as grating 140 in system 100 (FIG. 1) in some embodiments. Grating 200 includes a variable grating section 210 and a uniform grating section 220. In some embodiments, the uniform grating section 220 is omitted. Grating 200 includes openings 212-218 between grating features in the variable grating section 210. Each of the openings 212-218 has a different depth d1-d4. Grating 200 includes openings 222 between grating features in the uniform grating section 220. Each of the openings 222 has a same depth d5. Each of openings 212-218 and 222 in grating 200 have a substantially constant width. That is, the width is constant to within manufacturing error tolerances.

A pitch p of the grating features in the variable grating section 210 is substantially constant. In some embodiments, the pitch p is less than or equal to 1300 nm. The pitch p is determined based on a wavelength of optical signal 115. If the pitch p is too large or too small, then the grating 200 will be unable to redirect an incident optical signal at close to a 90-degree angle.

The depth d1 of the opening 212 is less than the depth d2 of the opening 214. Likewise, the depth d2 of the opening 214 is less than the depth d3 of the opening 216, which is less than the depth d4 of the opening 218. The depth d5 of the openings 222 is greater than the depth d4 of the opening 218. In some embodiments, the difference in the depths d1-d5 is consistent, e.g., a difference in the depth of d1 to the depth d2 is equal to the difference in the depth d2 to the depth d3, etc. In some embodiments, the difference in the depths d1-d5 is variable. In some embodiments, the depth d1 ranges from about 120 nm to about 180 nm. If the depth d1 is too great or too small, then the grating feature between the opening 212 and the opening 214 is unable to direct incident light into a waveguide layer, e.g., waveguide layer 124, in some instances. In some embodiments, the depth d2 ranges from about 150 nm to about 220 nm. If the depth d2 is too great or too small, then the grating feature between the opening 214 and the opening 216 is unable to direct incident light into a waveguide layer, e.g., waveguide layer 124, in some instances. In some embodiments, the depth d3 ranges from about 200 nm to about 280 nm. If the depth d3 is too great or too small, then the grating feature between the opening 216 and the opening 218 is unable to direct incident light into a waveguide layer, e.g., waveguide layer 124, in some instances. In some embodiments, the depth d4 ranges from about 260 nm to about 340 nm. If the depth d4 is too great or too small, then the grating feature between the opening 218 and the opening 222 is unable to direct incident light into a waveguide layer, e.g., waveguide layer 124, in some instances. In some embodiments, the depth d5 ranges from about 300 nm to about 400 nm. If the depth d5 is too great or too small, then the grating feature between adjacent openings 222 is unable to direct incident light into a waveguide layer, e.g., waveguide layer 124, in some instances.

The grating 200 includes a single opening, i.e., opening 212, having the depth d1. In some embodiments, the grating 200 includes multiple openings having the depth d1. Similarly, in some embodiments, the grating 200 includes multiple openings having any of depths d1-d5.

Figure 3:
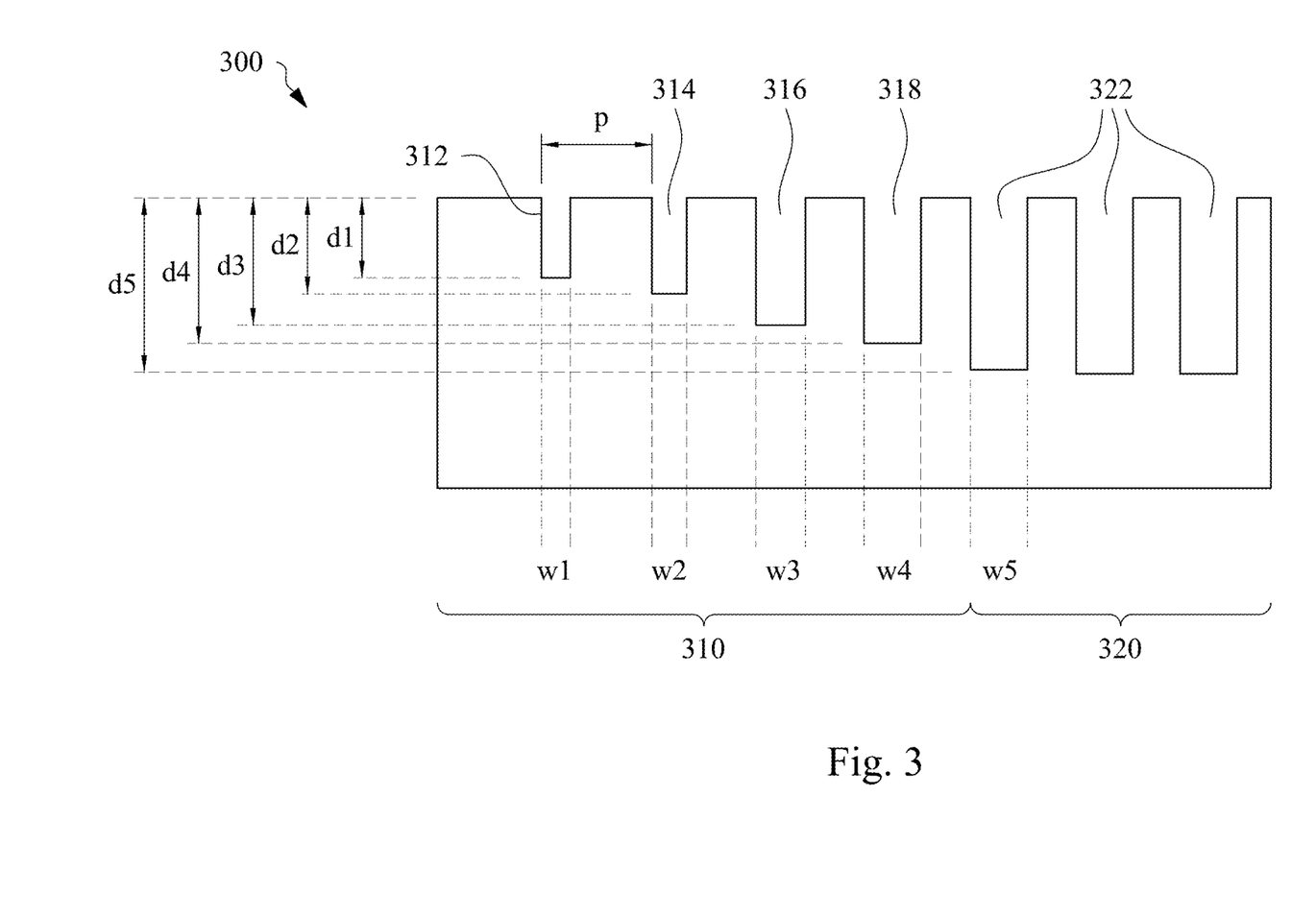
FIG. 3 is a cross sectional view of a grating in accordance with some embodiments.

FIG. 3 is a cross sectional view of a grating 300 in accordance with some embodiments. Grating 300 is usable as grating 140 in system 100 (FIG. 1) in some embodiments. Grating 300 includes a variable grating section 310 and a uniform grating section 320. In some embodiments, the uniform grating section 320 is omitted. Grating 300 includes openings 312-318 between grating features in the variable grating section 310. Each of the openings 312-318 has a different depth d1-d4, similar to grating 200 (FIG. 2). Grating 300 includes openings 322 between grating features in the uniform grating section 320, similar to grating 200. Each of the openings 322 has a same depth d5. The pitch p for grating 300 is uniform. In contrast to grating 200, grating 300 includes the openings 312-318 and 322 having different widths w1-w5. Depths d1-d5 and pitch p are similar to grating 200 and are not discussed here for the sake of brevity.

The width w1 of the opening 312 is less than the width w2 of the opening 314. Likewise, the width w2 of the opening 314 is less than the width w3 of the opening 316, which is less than the width w4 of the opening 318. The width w5 of the openings 322 is greater than the width w4 of the opening 318. In some embodiments, the difference in the widths w1-w5 is consistent, e.g., a difference in the width w1 to the width w2 is equal to the difference in the width w2 to the width w3, etc. In some embodiments, the difference in the widths w1-w5 is variable. In some embodiments, the width w1 ranges from greater than 0 nm to about 100 nm. If the width w1 is too great or too small, then the grating feature between the opening 312 and the opening 314 is unable to direct incident light into a waveguide layer, e.g., waveguide layer 124, in some instances. In some embodiments, the width w2 ranges from about 80 nm to about 140 nm. If the width w2 is too great or too small, then the grating feature between the opening 314 and the opening 316 is unable to direct incident light into a waveguide layer, e.g., waveguide layer 124, in some instances. In some embodiments, the width w3 ranges from about 120 nm to about 180 nm. If the width w3 is too great or too small, then the grating feature between the opening 316 and the opening 318 is unable to direct incident light into a waveguide layer, e.g., waveguide layer 124, in some instances. In some embodiments, the width w4 ranges from about 160 nm to about 210 nm. If the width w4 is too great or too small, then the grating feature between the opening 318 and the opening 322 is unable to direct incident light into a waveguide layer, e.g., waveguide layer 124, in some instances. In some embodiments, the width w5 ranges from about 190 nm to about 250 nm. If the width w5 is too great or too small, then the grating feature between adjacent openings 322 is unable to direct incident light into a waveguide layer, e.g., waveguide layer 124, in some instances.

The grating 300 includes a single opening, i.e., opening 312, having the width w1. In some embodiments, the grating 300 includes multiple openings having the width w1. Similarly, in some embodiments, the grating 300 includes multiple openings having any of widths w1-w5.

Figure 4:
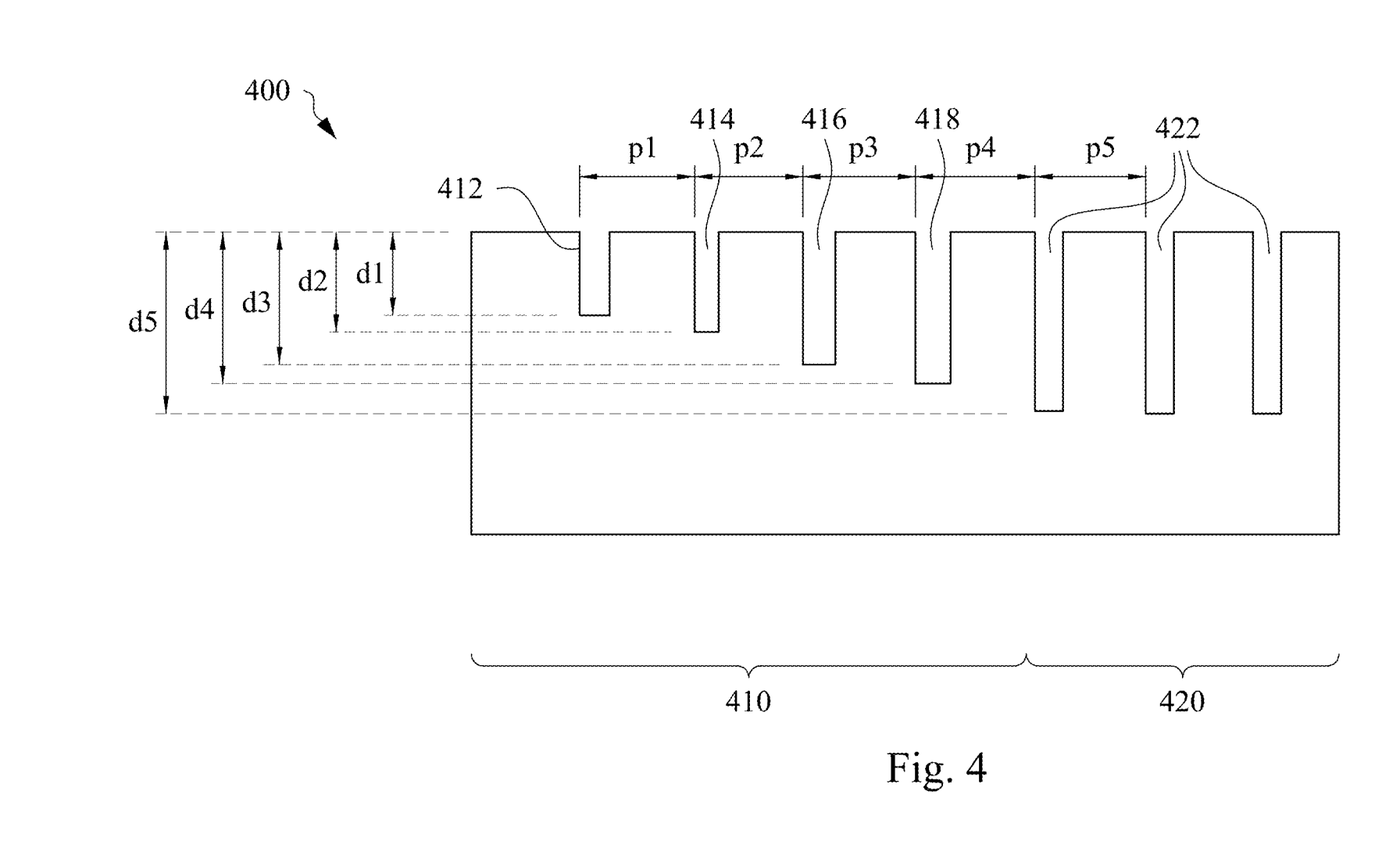
FIG. 4 is a cross sectional view of a grating in accordance with some embodiments.

FIG. 4 is a cross sectional view of a grating 400 in accordance with some embodiments. Grating 400 is usable as grating 140 in system 100 (FIG. 1) in some embodiments. Grating 400 includes a variable grating section 410 and a uniform grating section 420. In some embodiments, the uniform grating section 420 is omitted. Grating 400 includes openings 412-418 between grating features in the variable grating section 410. Each of the openings 412-418 has a different depth d1-d4, similar to grating 200 (FIG. 2). Grating 400 includes openings 422 between grating features in the uniform grating section 420, similar to grating 200. Each of the openings 422 has a same depth d5. The width for each grating feature in grating 400 is uniform, similar to grating 200. In contrast to grating 200, grating 400 includes different pitches p1-p5 between the openings 412-418 and 422. Depths d1-d5 are similar to grating 200 and are not discussed here for the sake of brevity.

The pitch p1 between the opening 412 and the opening 414 is less than the pitch p2 between the opening 414 and the opening 416. Likewise, the pitch p2 between the opening 414 and the opening 416 is less than the pitch p3 between the opening 316 and the opening 318, which is less than the pitch p4 between the opening 418 and the opening 422. The pitch p5 between adjacent openings 422 is greater than the pitch p4. In some embodiments, the difference in the pitches p1-p5 is consistent, e.g., a difference in the pitch p1 to the pitch p2 is equal to the difference in the pitch p2 to the pitch p3, etc. In some embodiments, the difference in the pitches p1-p5 is variable. In some embodiments, the pitch p1 ranges from about 400 nm to about 550 nm. If the pitch p1 is too great or too small, then the grating feature between the opening 412 and the opening 414 is unable to direct incident light into a waveguide layer, e.g., waveguide layer 124, in some instances. In some embodiments, the pitch p2 ranges from about 500 nm to about 700 nm. If the pitch p2 is too great or too small, then the grating feature between the opening 414 and the opening 416 is unable to direct incident light into a waveguide layer, e.g., waveguide layer 124, in some instances. In some embodiments, the pitch p3 ranges from about 650 nm to about 800 nm. If the pitch p3 is too great or too small, then the grating feature between the opening 416 and the opening 418 is unable to direct incident light into a waveguide layer, e.g., waveguide layer 124, in some instances. In some embodiments, the pitch p4 ranges from about 750 nm to about 900 nm. If the pitch p4 is too great or too small, then the grating feature between the opening 418 and the opening 422 is unable to direct incident light into a waveguide layer, e.g., waveguide layer 124, in some instances. In some embodiments, the pitch p5 ranges from about 850 nm to about 1,000 nm. If the pitch p5 is too great or too small, then the grating feature between adjacent openings 422 is unable to direct incident light into a waveguide layer, e.g., waveguide layer 124, in some instances.

The grating 400 includes a single grating feature, i.e., between the opening 412 and the opening 414, having the pitch p1. In some embodiments, the grating 400 includes multiple grating features having the pitch p1. Similarly, in some embodiments, the grating 400 includes multiple grating features having any of pitches p1-p5.

The grating 200, the grating 300 and the grating 400 provide different examples of variable grating sections having different geometric properties. One of ordinary skill in the art would recognize that this disclosure is not limited to solely the different geometric property combinations explicitly discussed above; and that other combinations of different geometric property combinations are within the scope of this disclosure.

Figure 5:
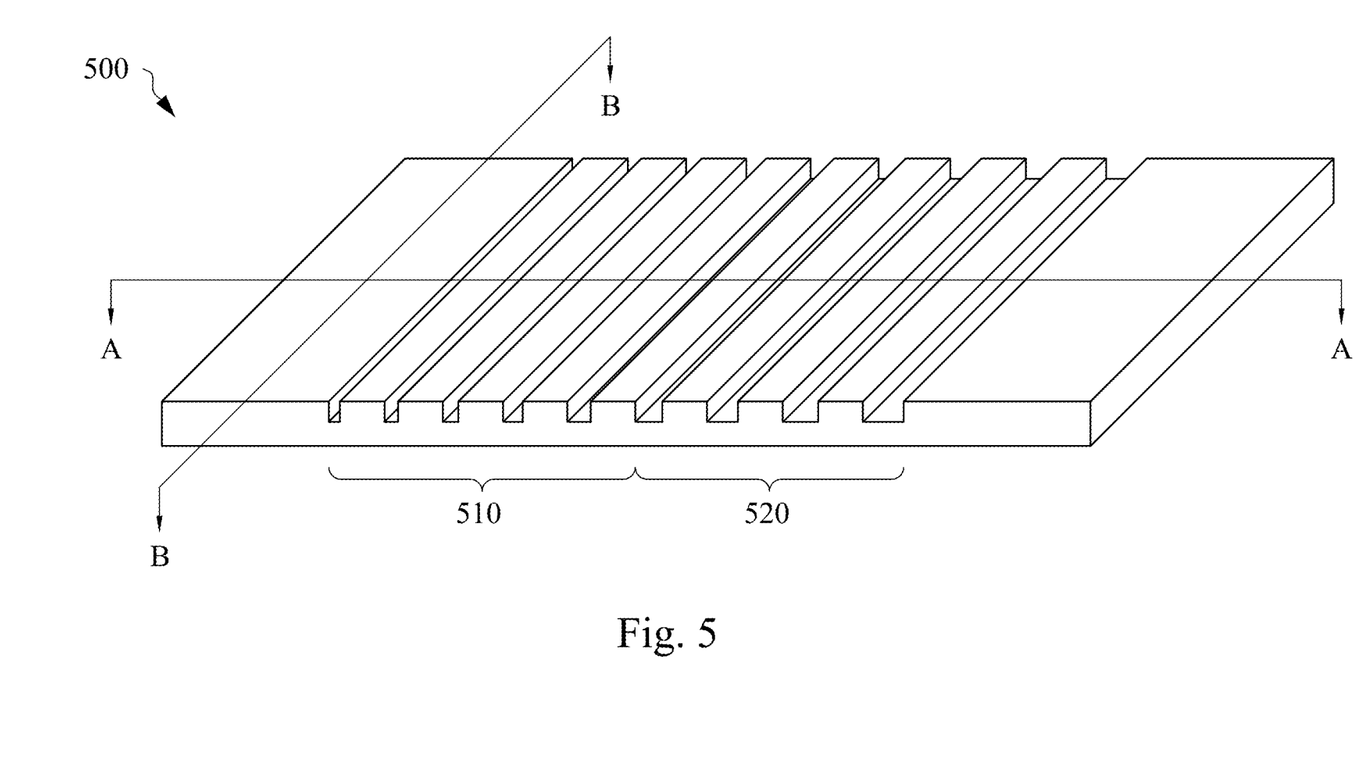
FIG. 5 is a perspective view of a grating in accordance with some embodiments.

FIG. 5 is a perspective view of a grating 500 in accordance with some embodiments. Grating 500 is usable as grating 140 in system 100 (FIG. 1) in some embodiments. Grating 500 includes a variable grating section 510 and a uniform grating section 520. In some embodiments, the uniform grating section 520 is omitted. In some embodiments, the grating 500 has geometric properties similar to the grating 200 (FIG. 2). In some embodiments, the grating 500 has geometric properties similar to the grating 300 (FIG. 3). In some embodiments, the grating 500 has geometric properties similar to the grating 400 (FIG. 4). Gratings 200, 300 and 400 (FIGS. 2-4) are cross sectional views of the grating 500 taken along line A-A, in some embodiments. Grating 700 (FIG. 7) is a cross sectional view of the grating 500 taken along line B-B.

Figure 6A:
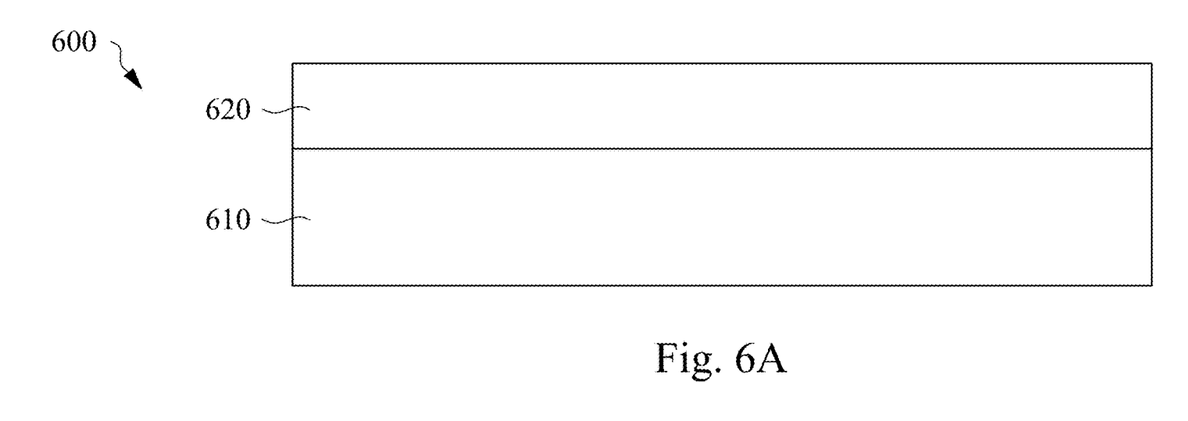
FIGS. 6A-6H are cross sectional views of a grating during various stage of manufacturing in accordance with some embodiments.

FIG. 6A is a cross sectional view of a grating 600 during an intermediate stage of manufacturing according to some embodiments. At the stage in FIG. 6A, the grating 600 includes an ILD 610 and an optically transmissive layer 620 on the ILD 610. In some embodiments, the ILD 610 includes silicon oxide or another suitable dielectric material. In some embodiments, the optically transmissive layer 620 includes silicon, plastic or another suitable optically transmissive material.

Figure 6B:
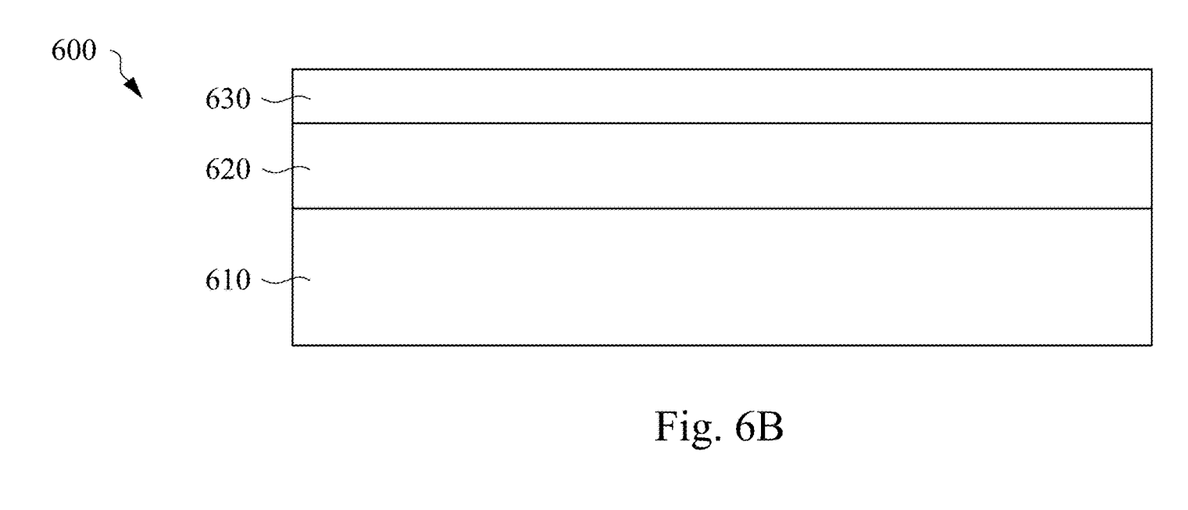

FIG. 6B is a cross sectional view of the grating 600 during an intermediate stage of manufacturing according to some embodiments. At the stage in FIG. 6B, a masking layer 630 is over optically transmissive layer 620. In some embodiments, the masking layer 630 includes a photoresist material.

Figure 6C:
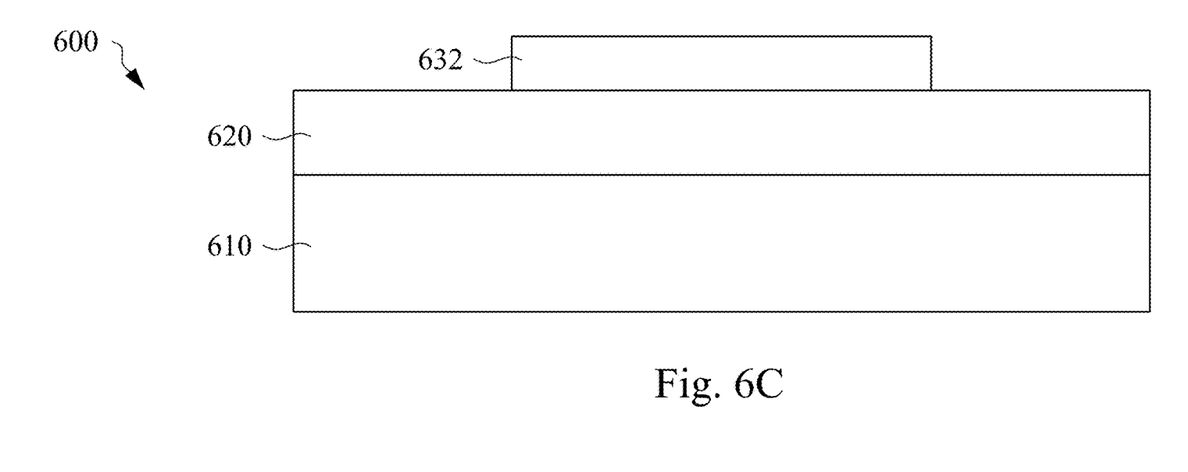

FIG. 6C is a cross sectional view of the grating 600 during an intermediate stage of manufacturing according to some embodiments. At the stage in FIG. 6C, the masking layer 630 was patterned, using photolithography, to define mask 632 over a portion of the optically transmissive layer 620.

Figure 6D:
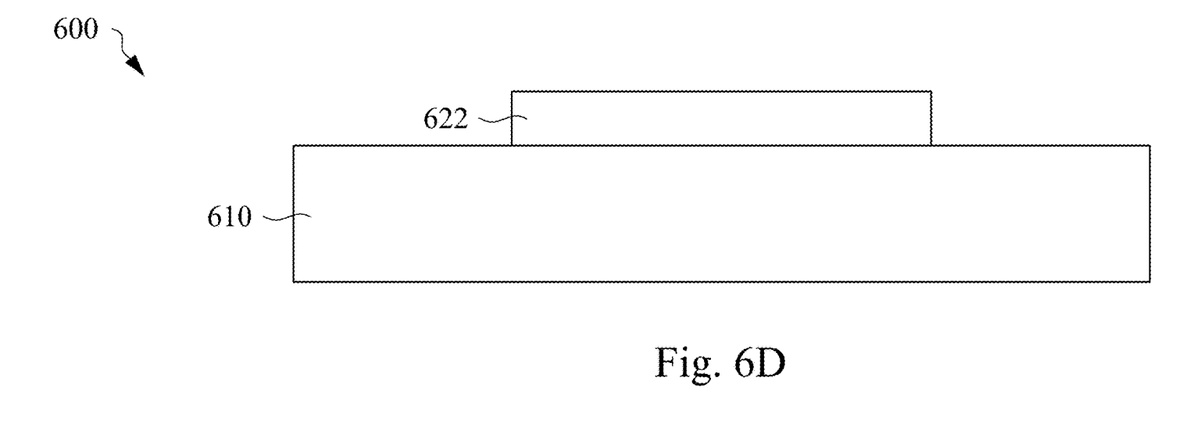

FIG. 6D is a cross sectional view of the grating 600 during an intermediate stage of manufacturing according to some embodiments. At the stage in FIG. 6D, the optically transmissive layer 620 was etched to define an optical block 622 using the mask 632. In some embodiments, the etching is a dry etching. In some embodiments, the etching is a wet etching. The mask 632 was then removed by resist stripping.

Figure 6E:
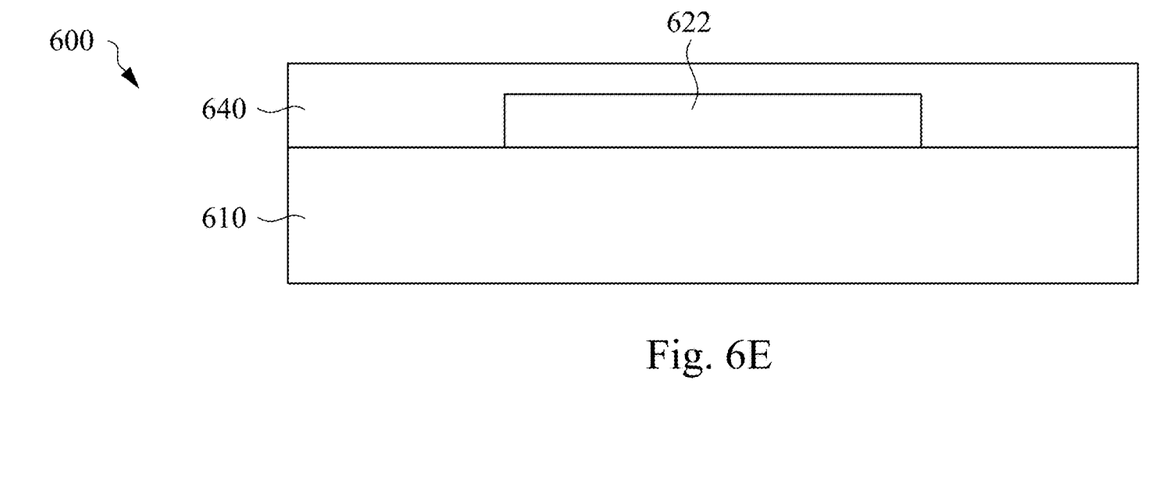

FIG. 6E is a cross sectional view of the grating 600 during an intermediate stage of manufacturing according to some embodiments. At the stage in FIG. 6E, a masking layer 640 is on the optical block 622. In some embodiments, the masking layer 640 includes a photoresist material. In some embodiments, the masking layer 640 includes a same material as the masking layer 630. In some embodiments, the masking layer 640 includes a different material from the masking layer 630. The masking layer 640 covers sidewalls of the optical block 622 and portions of the ILD 610 exposed by the grating region.

Figure 6F:
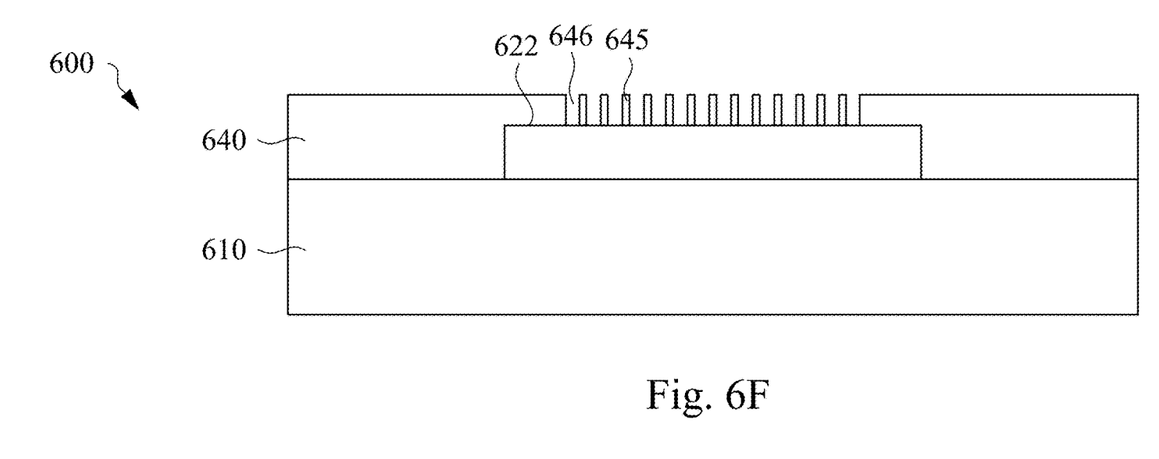

FIG. 6F is a cross sectional view of the grating 600 during an intermediate stage of manufacturing according to some embodiments. At the stage in FIG. 6F, the masking layer 640 is patterned, using photolithography, to define a plurality of trenches 646 and a plurality of features 645.

Figure 6G:
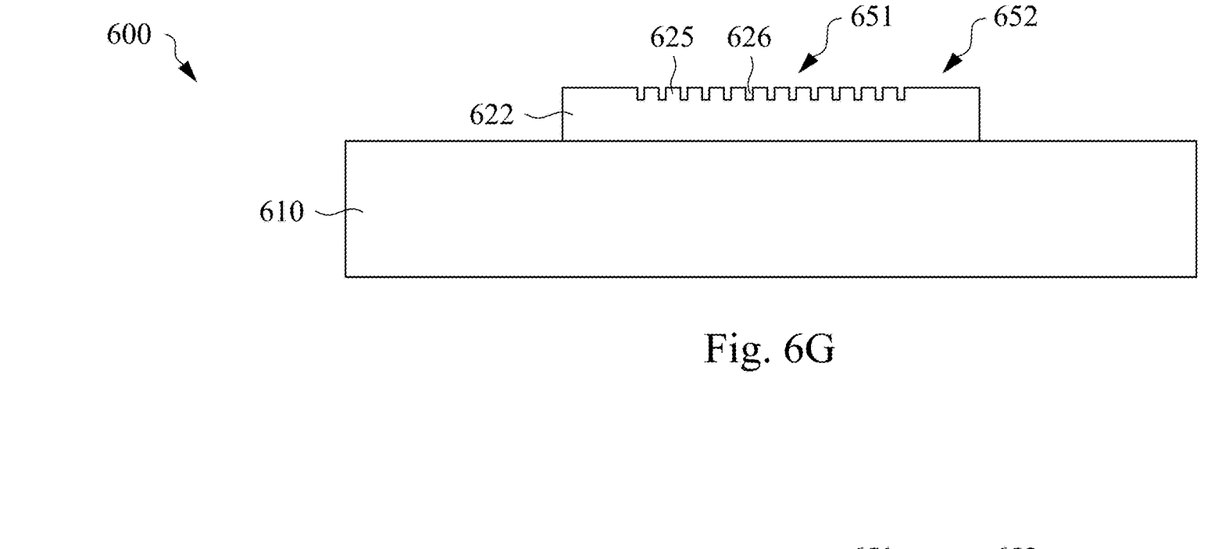

FIG. 6G is a cross sectional view of the grating 600 during an intermediate stage of manufacturing according to some embodiments. At the stage in FIG. 6G, the pattern of the masking layer 640 is transferred to the optical block 622 by etching. In some embodiments, the etching is a dry etching. In some embodiments, the etching is a wet etching. In some embodiments, the etching is a single step etching. The etching defines a plurality of recesses 626 and a plurality of features 625 in the optical block 622. The patterned masking layer 640 is then removed. In some embodiments, the patterned masking layer 640 is removed using photoresist stripping. The portions of the optical block 622 that includes the recesses 626 and the features 625 is a grating region 651. The portions of the optical block 622 outside of the recesses 626 and features 625 is a waveguide region 652.

Figure 6H:
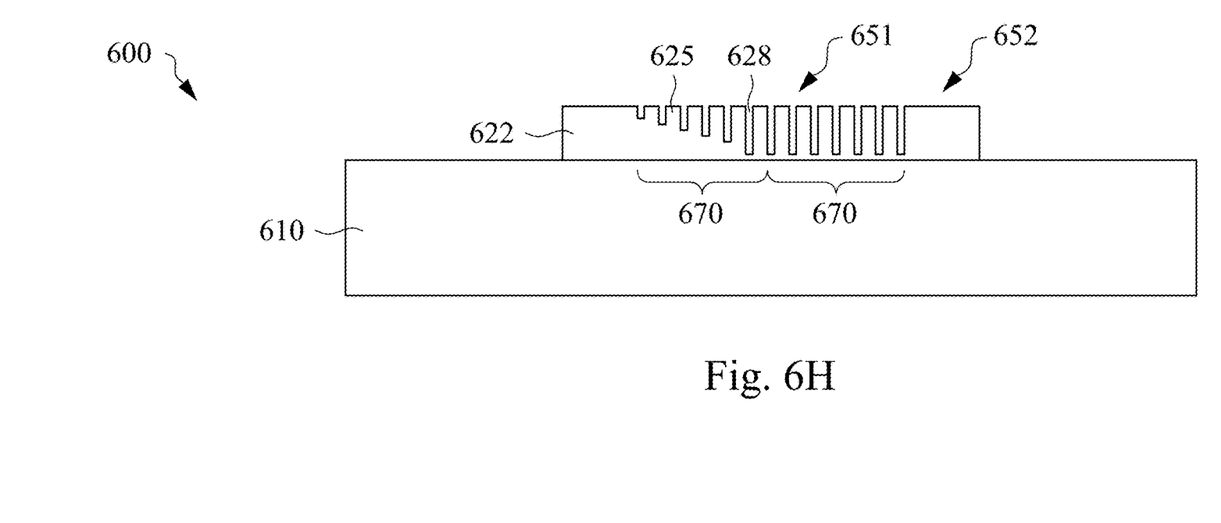

FIG. 6H is a cross sectional view of the grating 600 during an intermediate stage of manufacturing according to some embodiments. At the stage in FIG. 6H, the recesses 626 are further etched to increase the depth of the recesses 626 to define trenches 628. The etching includes multiple stages of etching in order to define at least a variable grating region 660. In some embodiments, the etching includes multiple stages to define a uniform grating region 670. In some embodiments, the multiple etching stages includes masking portions of the optical block 622 during etching of specific recess or groups of recesses to expand the recesses 626 to form the trenches 628. For example, in some embodiments, all recesses are etched to a first trench depth; then all trenches designed to have the first trench depth are masked; and the unmasked trenches are etched to a second trench depth. The process is repeated until all trenches reach the corresponding designed trench depth.

Figure 7:
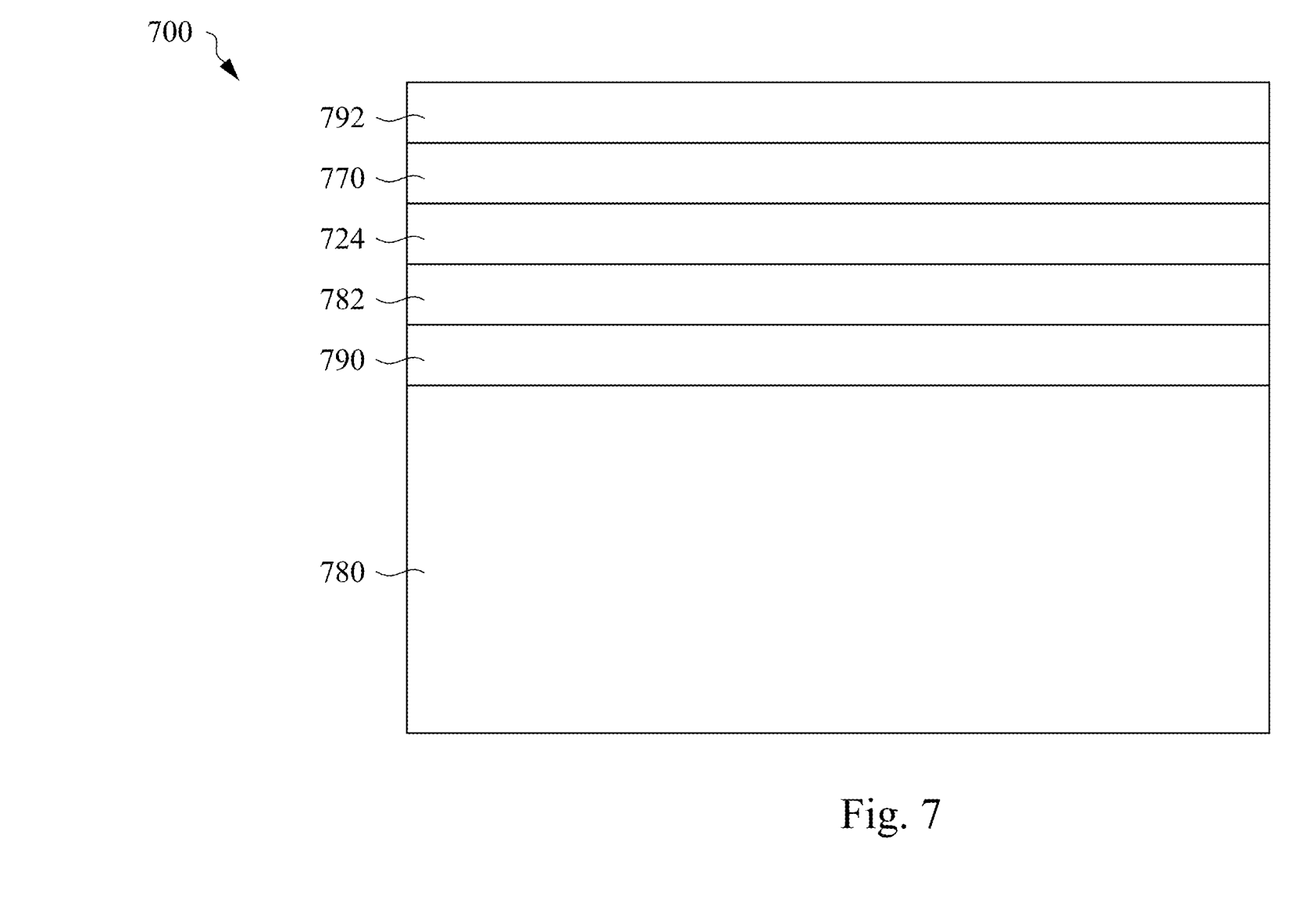
FIG. 7 is a cross sectional view of a grating in accordance with some embodiments.

FIG. 7 is a cross sectional view of a grating 700 in accordance with some embodiments. The grating includes a substrate 780. Substrate 780 is similar to substrate 122 (FIG. 1). A first reflection layer 790 is over the substrate 780. A first oxide layer 782 is over the first reflection layer 790. A waveguide layer 724 is over the first oxide layer 782. The waveguide layer 724 is similar to the waveguide layer 124. A cladding layer 770 is over the waveguide layer. A second reflection layer 792 is over the cladding layer.

The first reflection layer 790 reflects light from an optical signal back toward a top surface of the grating 700 in order to prevent the light from being lost into the substrate 780. In some embodiments, the first reflection layer 790 includes aluminum, copper, nickel, alloys thereof, or another suitable material. In some embodiments, a thickness of the first reflection layer 790 ranges from about 0.1 µm to about 10 µm. If the thickness of the first reflection layer 790 is too small, a risk of light from the optical signal escaping the grating 700 increases, in some instances. If the thickness of the first reflection layer 790 is too great, material is wasted without a noticeable improvement in performance, in some instances.

The first oxide layer 782 supports the waveguide layer 724 and has a different refractive index from the waveguide layer 724. The difference in refractive index helps to reflect light from the optical signal back into the waveguide layer 724 during propagation of the optical signal along the waveguide layer 724. In some embodiments, the first oxide layer 782 has a thickness ranging from about 500 nm to about 3,000 nm. If the thickness of the first oxide layer 782 is too small, then a risk of light penetrating through the first oxide layer 782 increases, in some instances. If the thickness of the first oxide layer 782 is too great, then material is wasted without a noticeable improvement in performance in some instances. In some embodiments, the first oxide layer 782 contains a material other than silicon oxide, such as silicon nitride, aluminum oxide, hafnium oxide or another suitable material.

The cladding layer 770 helps to reflect light from the optical signal back into the waveguide layer 724 similar to the first oxide layer 782. In some embodiments, a thickness of the cladding layer ranges from about 0.6 μm to about 3 μm. If the thickness of the cladding layer 770 is too small, then a risk of light penetrating through the cladding layer 770 increases, in some instances. If the thickness of the cladding layer 770 is too great, then material is wasted without a noticeable improvement in performance in some instances. In some embodiments, the cladding layer 770 contains silicon oxide, silicon nitride, aluminum oxide, hafnium oxide or another suitable material. In some embodiments, the cladding layer 770 contains a same material as the first oxide layer 782. In some embodiments, the cladding layer 770 contains a different material from the first oxide layer 782.

The second reflection layer 792 reflects light from the optical signal back toward a bottom surface of the grating 700 in order to prevent the light from being lost out of the grating 700. In some embodiments, the second reflection layer 792 includes aluminum, copper, nickel, alloys thereof, or another suitable material. In some embodiments, the second reflection layer 792 contains a same material as the first reflection layer 790. In some embodiments, the second reflection layer 792 contains a different material from the first reflection layer 790. In some embodiments, a thickness of the second reflection layer 792 ranges from about 0.1 μm to about 10 μm. If the thickness of the second reflection layer 792 is too small, a risk of light from the optical signal escaping the grating 700 increases, in some instances. If the thickness of the second reflection layer 792 is too great, material is wasted without a noticeable improvement in performance, in some instances. In some embodiments, the thickness of the second reflection layer 792 is different from the thickness of the first reflection layer 790. In some embodiments, the thickness of the second reflection layer 792 is equal to the thickness of the first reflection layer 790. In some embodiments, the second reflection layer 792 is only over portions of the waveguide layer 724 that does not include a grating in order to maximize the transmission of the optical signal, e.g., the optical signal 115 (FIG. 1), to the grating for transmission along the waveguide layer 724.

Figure 8:
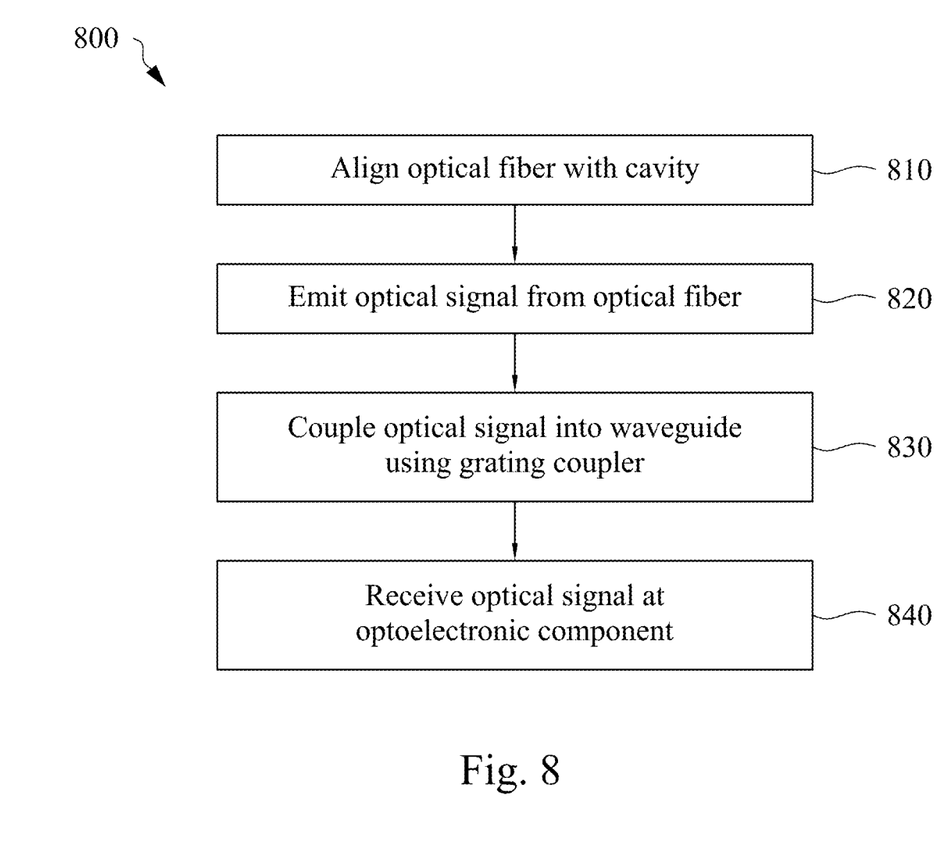
FIG. 8 is a flowchart of a method of using a fiber to chip coupling system in accordance with some embodiments.

FIG. 8 is a flowchart of a method 800 of using a fiber to chip coupling system in accordance with some embodiments. In operation 810, an optical fiber, e.g., the optical fiber 110 (FIG. 1), is aligned with a cavity, e.g., the cavity 136. The cavity is wider than the optical fiber. In some embodiments, the optical fiber is a single mode optical fiber. In some embodiments, the optical fiber is concentric with the cavity. In some embodiments, a center of the optical fiber is offset with respect to a center of the cavity. In some embodiments, the optical fiber is oriented perpendicular to a bottom surface of the cavity. In some embodiments, the optical fiber is angled up to 2-degrees with respect a normal line from the bottom surface of the cavity.

In operation 820, an optical signal is emitted from the optical fiber. The optical signal, e.g., optical signal 115 (FIG. 1), diverges as the optical signal exits the optical fiber. The optical signal propagates into the cavity from the optical fiber.

In operation 830, the optical signal is coupled into a waveguide using a grating coupler. The grating coupler, e.g., the grating 140 (FIG. 1), includes at least a variable grating region. In some embodiments, the grating coupler further includes a uniform grating region. The grating coupler receives the optical signal emitted from the optical fiber and redirects the optical signal in a substantially 90-degree direction into the waveguide. In some embodiments, the grating coupler is integral with the waveguide. Geometric properties of the grating coupler are based on the wavelength of the optical signal.

In operation 840, the optical signal is received by an optoelectronic component connected to the waveguide. The optical signal travels along the waveguide. In some embodiments, the optical signal is kept within the waveguide by cladding or reflection layers surrounding the waveguide. Once the optical signal is received by the optoelectronic component, the optical signal is converted into an electrical signal for use by electronic components.

In some embodiments, method 800 includes additional operations. For example, in some embodiments, the method 800 includes converting the optical signal into an electrical signal. In some embodiments, at least one operation of method 800 is omitted. For example, in some embodiments, operation 840 is omitted and the waveguide optically connects to another optical fiber. In some embodiments, an order of operation of method 800 is different. For example, in some embodiments, operation 820 is performed simultaneously with operation 810.

An aspect of this description relates to a coupling system. The coupling system includes an optical fiber configured to carry an optical signal. The coupling system further includes a chip in optical communication with the optical fiber. An angle between the optical fiber and a top surface of the chip ranges from about 92-degrees to about 88-degrees. The chip includes a grating configured to receive the optical signal; and a waveguide, wherein the grating is configured to receive the optical signal and redirect the optical signal along the waveguide. In some embodiments, the optical fiber has a first width, the chip defines a cavity between the optical fiber and the grating, the cavity has a second width, and the second width is about 10% to about 20% greater than the first width. In some embodiments, the chip includes an interconnect structure, and the cavity extends into the interconnect structure. In some embodiments, the optical fiber is a single mode optical fiber. In some embodiments, the grating includes a variable grating region. In some embodiments, the grating defines a first plurality of trenches in the variable grating region, a depth of a first trench of the first plurality of trenches is different from a depth of a second trench of the first plurality of trenches. In some embodiments, the grating further includes a uniform grating system. In some embodiments, the grating defines a second plurality of trenches in the uniform grating region, a depth of each of the second plurality of trenches is equal, and the depth of each of the second plurality of trenches is different from the depth of the first trench and the depth of the second trench. In some embodiments, the grating includes a plurality of grating features in the variable grating region, and a pitch between a first grating feature of the plurality of grating features and second grating feature of the plurality of grating features is different from a pitch between the second grating feature and a third grating feature of the plurality of grating features. In some embodiments, the grating defines a plurality of trenches in the variable grating region, and a width of a first trench of the plurality of trenches is different from a width of a second trench of the plurality of trenches. In some embodiments, the grating is configured to redirect the optical signal 90-degrees from an incident angle of the optical signal.

An aspect of this description relates to a coupling system. The coupling system includes an optical fiber configured to carry an optical signal, wherein the optical fiber has a first width. The coupling system further includes a chip in optical communication with the optical fiber, wherein the chip defines a cavity having a second width, the second width is about 10% to about 20% greater than the first width. The chip includes a grating configured to receive the optical signal; a waveguide configured to receive the optical signal redirected from the grating; and an interconnect structure over the grating. In some embodiments, the cavity extends through the interconnect structure. In some embodiments, the cavity extends through an entirety of the interconnect structure. In some embodiments, the grating is integral with the waveguide. In some embodiments, the grating includes a variable grating region. In some embodiments, at least one geometric property of the grating varies within the variable grating region. In some embodiments, the at least one geometric property is selected from the group consisting of pitch, depth and width. In some embodiments, the grating comprising a uniform grating region, and each of the pitch, depth and width of the grating are uniform in the uniform grating region.

An aspect of this description relates to a method of using a coupling system. The method includes aligning an optical fiber with a cavity in a chip, wherein aligning the optical fiber comprises orienting the fiber within an angle ranging from about 88-degrees to about 92-degrees with respect to a top surface of the chip. The method further includes emitting an optical signal from the optical fiber. The method further includes redirecting the optical signal into a waveguide using a grating positioned on an opposite side of the cavity from the optical fiber.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A coupling system comprising:
an optical fiber configured to carry an optical signal; and
a chip in optical communication with the optical fiber, wherein an angle between a longitudinal axis of the optical fiber and a top surface of the chip ranges from about 92-degrees to about 88-degrees, and the chip comprises:
a grating configured to receive the optical signal; and
a waveguide, wherein the grating is configured to receive the optical signal and redirect the optical signal along the waveguide, and the grating is on a light incident side of the waveguide closest to the optical fiber.

2. The coupling system of claim 1, wherein the optical fiber has a first width, the chip defines a cavity between the optical fiber and the grating, the cavity has a second width, and the second width is about 10% to about 20% greater than the first width.

3. The coupling system of claim 2, wherein the chip comprises an interconnect structure, and the cavity extends into the interconnect structure.

4. The coupling system of claim 1, wherein the optical fiber is a single mode optical fiber.

5. The coupling system of claim 1, wherein the grating comprises a variable grating region.

6. The coupling system of claim 5, wherein the grating defines a first plurality of trenches in the variable grating region, a depth of a first trench of the first plurality of trenches is different from a depth of a second trench of the first plurality of trenches.

7. The coupling system of claim 6, wherein the grating further comprises a uniform grating system.

8. The coupling system of claim 7, wherein the grating defines a second plurality of trenches in the uniform grating system, a depth of each of the second plurality of trenches is equal, and the depth of each of the second plurality of trenches is different from the depth of the first trench and the depth of the second trench.

9. The coupling system of claim 5, wherein the grating comprises a plurality of grating features in the variable grating region, and a pitch between a first grating feature of the plurality of grating features and second grating feature of the plurality of grating features is different from a pitch between the second grating feature and a third grating feature of the plurality of grating features.

10. The coupling system of claim 5, wherein the grating defines a plurality of trenches in the variable grating region, and a width of a first trench of the plurality of trenches is different from a width of a second trench of the plurality of trenches.

11. The coupling system of claim 5, wherein the grating is configured to redirect the optical signal 90-degrees from an incident angle of the optical signal.

12. A coupling system comprising:
an optical fiber configured to carry an optical signal, wherein the optical fiber has a first width; and
a chip in optical communication with the optical fiber, wherein the chip defines a cavity having a second width, the second width is about 10% to about 20% greater than the first width, an angle between a longitudinal axis of the optical fiber and a top surface of the chip ranges from about 92-degrees to about 88-degrees, and the chip comprises:
a grating configured to receive the optical signal;
a waveguide configured to receive the optical signal redirected from the grating; and
an interconnect structure over the grating.

13. The coupling system of claim 12, wherein the cavity extends through the interconnect structure.

14. The coupling system of claim 12, wherein the cavity extends through an entirety of the interconnect structure.

15. The coupling system of claim 12, wherein the grating is integral with the waveguide.

16. The coupling system of claim 12, wherein the grating comprises a variable grating region.

17. The coupling system of claim 16, wherein at least one geometric property of the grating varies within the variable grating region.

18. The coupling system of claim 17, wherein the at least one geometric property is selected from the group consisting of pitch, depth and width.

19. The coupling system of claim 18, wherein the grating comprising a uniform grating region, and each of the pitch, depth and width of the grating are uniform in the uniform grating region.

20. A coupling system comprising:
    an optical fiber configured to carry an optical signal; and
    a chip in optical communication with the optical fiber, wherein an angle between a longitudinal axis of the optical fiber and a top surface of the chip ranges from about 92-degrees to about 88-degrees, and the chip comprises:
        a grating configured to receive the optical signal; and
        a waveguide, wherein the grating is configured to receive the optical signal and redirect the optical signal along the waveguide, and the grating is integral with the waveguide on a side of the waveguide closest to the optical fiber.

* * * * *